US009092348B2

(12) United States Patent
Heath

(10) Patent No.: US 9,092,348 B2
(45) Date of Patent: Jul. 28, 2015

(54) SYSTEM AND METHOD FOR SLICE PROCESSING COMPUTER-RELATED TASKS

(75) Inventor: Chester Heath, Boca Raton, FL (US)

(73) Assignees: The Quantum Group, Inc., West Palm Beach, FL (US); Noel J. Guillama, Wellington, FL (US)

(*) Notice: Subject to any disclaimer, the term of this patent is extended or adjusted under 35 U.S.C. 154(b) by 406 days.

(21) Appl. No.: 13/572,164

(22) Filed: Aug. 10, 2012

(65) Prior Publication Data
US 2013/0042075 A1    Feb. 14, 2013

Related U.S. Application Data

(60) Provisional application No. 61/522,576, filed on Aug. 11, 2011.

(51) Int. Cl.
*G06F 12/00* (2006.01)
*G06F 12/08* (2006.01)

(52) U.S. Cl.
CPC .................. *G06F 12/0895* (2013.01)

(58) Field of Classification Search
CPC .................................. G06F 12/0895
USPC ........................................ 711/140
See application file for complete search history.

(56) References Cited

U.S. PATENT DOCUMENTS

2010/0138604 A1* 6/2010 Noguchi et al. ............. 711/114

* cited by examiner

*Primary Examiner* — Aracelis Ruiz
(74) *Attorney, Agent, or Firm* — Novak Druce Connolly Bove + Quigg LLP

(57) ABSTRACT

A computer-based systems and methods for task processing in a computing device are provided. A method includes the step of entering a slice mode for at least one task, the entering comprising reserving one or more portions of a cache memory to yield a slice cache memory for the task. The method also includes the step of storing a slice in the slice cache memory, wherein the slice comprises at least one program residing in at least one memory space outside of the slice cache memory and associated with the at least one task. The method further includes the step of processing the at least one task utilizing the at least one program by accessing the at least one slice cache memory until the slice mode is terminated.

26 Claims, 5 Drawing Sheets

500

100

200

300

SYSTEM AND METHOD FOR SLICE PROCESSING COMPUTER-RELATED TASKS

CROSS-REFERENCE TO RELATED APPLICATIONS

The present invention claims priority to U.S. Provisional Patent Application No. 61/522,576, filed Aug. 11, 2011 and entitled "SYSTEM AND METHOD FOR SLICE PROCESSING COMPUTER-RELATED TASKS", the contents of which are herein incorporated by reference in their entirety.

FIELD OF THE INVENTION

The present invention is related to the fields of computer memory, processing, and resource optimization, and more particularly, to computer-based systems and methods for utilizing cache memory capabilities for slice processing various tasks and operations.

BACKGROUND OF THE INVENTION

In the world of computing, there has been an ever-increasing emphasis on increasing the speed of computing, and, in particular, optimizing the processing of various tasks that computing devices handle. Most of today's central processing units (CPU) are designed to include at least one cache memory, of which there are assortments of types. Cache memory is often organized as a pipeline of instructions and data, where various schemes for optimal performance improvement select what is retained in the cache. Specifically, cache memory is typically faster, but smaller in capacity than backing store memory and resides between the CPU and the backing store memory. Cache memory is utilized to maintain a subset of data and instructions from backing store memory that has a high probability of being used by CPU. A CPU can access cache memory much faster than backing store memory, and therefore cache memory is very useful in increasing the overall speed of computing. While processing various tasks, it would be advantageous to fully process the tasks or portions of the tasks at cache memory speeds. In fact, processors often spend a prohibitive amount of time processing at backing store memory speeds or require control logic functions which would be time prohibitive, costly, and overly consumptive of memory space.

As a result, there is a need for more effective and efficient means for optimizing task processing by utilizing cache capabilities. Furthermore, there is a need for effective and efficient systems and methods creating a mode for processing tasks or portions of tasks at cache memory speeds.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
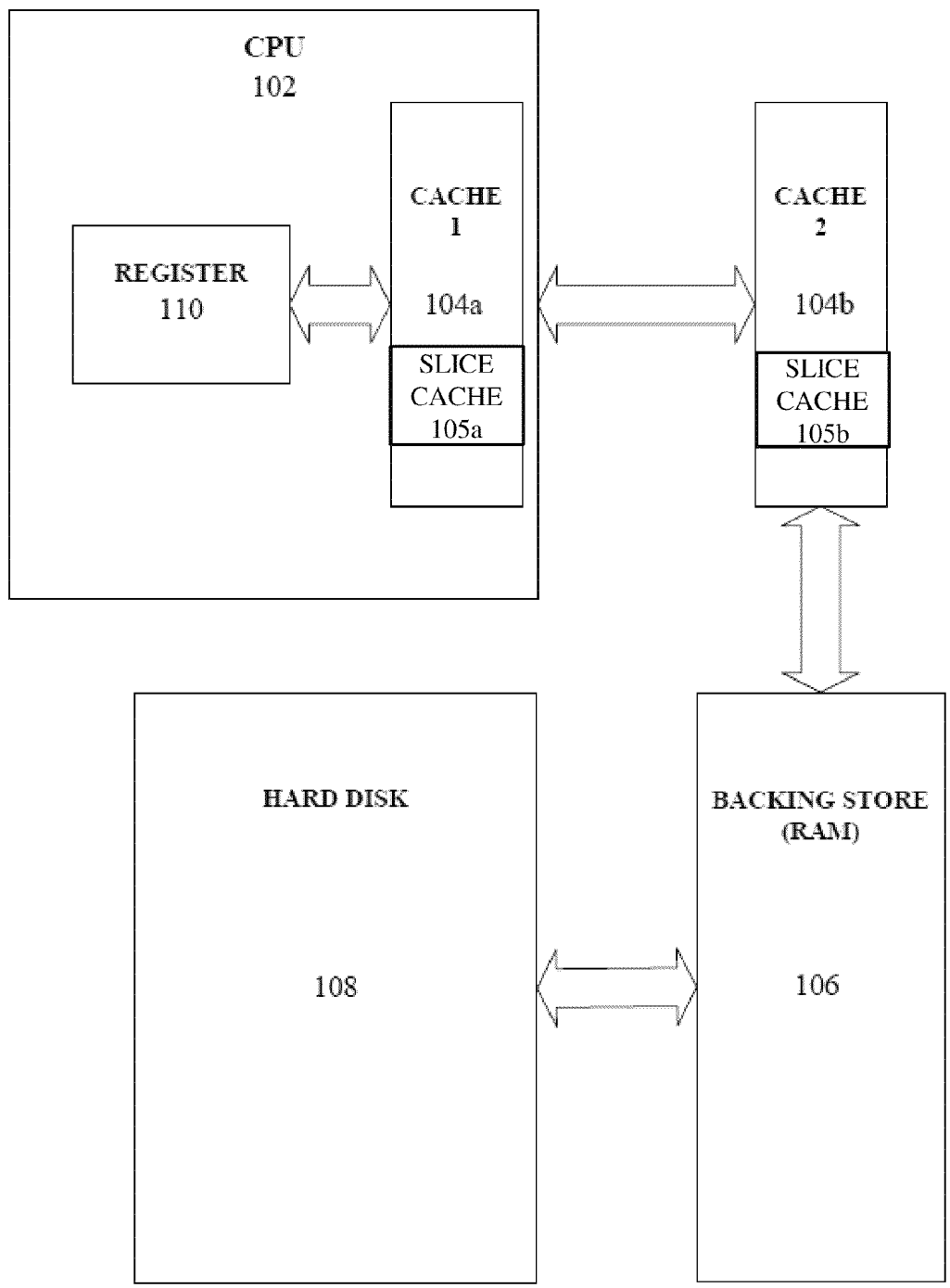
FIG. 1 is a schematic view of a system for optimizing task processing by utilizing cache capabilities, according to one embodiment of the invention.

Referring initially to FIG. 1, a system 100 for optimizing task processing by utilizing cache capabilities, according to one embodiment of the invention, is schematically illustrated. The system can include one or more processors 102 configured to manage and process data. The system 100 can also include one or more cache memories 104a-b communicatively linked to the one or more processors 102. Additionally, the system 100 can include one or more backing store memories 106 communicatively linked to the one or more processors 102 and the one or more cache memories 104a-b. The backing store memory 106 can comprise, but is not limited to, one or more of a random-access memory (RAM), a hard disk, a magnetic disk, an optical disk, a cache memory, a flash memory, and other memories. Furthermore, the system 100 can include a hard disk 108 and a register 110. Even though one processor 102, two cache memories 104a-b, one backing store memory 106, one hard disk 108 and one register 110 are shown, it will be apparent to one of ordinary skill based on the description that a greater number of processors, backing store memories, hard disks, and registers can be used and that a greater or lesser number of cache memories can be used according to the invention.

Notably, the one or more processors 102 can be implemented in hardwired, dedicated circuitry for performing the operative functions described herein. In another embodiment, the one or more processors 102 can be implemented in computer-readable code configured to execute on a particular computing machine. In yet another embodiment, however, the one or more processors 102 can be implemented in a combination of hardwired circuitry and computer-readable code.

Operatively, when the processor 102 encounters a particular task for processing, it can be configured to enter into a slice mode from a current mode. The slice mode can be triggered upon the receipt of a computer instruction, a signal such as an interrupt, and the like. In the various embodiments, the processor 102 enters into a slice mode by reserving at least a portion of the cache memories 104a-b to define a slice cache. The slice cache can be defined in cache memory 104a (slice cache 105a), cache memory 104b (slice cache 105b), or both.

In the various embodiments, the size of the slice cache 105a-105b can vary. In some embodiments, the size can be a system-defined static value. In other embodiments, the size can be computed based on a type of task, application, or other operation associated with the slice mode. That is, some types of tasks may not require as much dedicated cache memory as other tasks. In still other embodiments, the size of the task can be determined based on past or present performance. For example, if a particular task, even when performed in slice mode, did not meet a performance criteria, the size of the slice cache 105a-105b can be expanded during a subsequent performance of the task. Similarly, if a particular task, even when performed in slice mode, met a performance criteria or does not improve after a size increase, the size of the slice cache 105a-105b can be reduced during a subsequent performance of the task to determine a minimum size for the slice cache 105a-105b. In such a configuration, this allows a larger portion of the cache memories 104a-104b to be freed up and utilized for other purposes.

In an embodiment featuring multiple processors, some of the processors can enter slice mode while others can stay in their current mode. For example, if there are five processors, then two can enter slice mode while the remaining three can stay in their current modes.

As noted above, once the processor 102 is in a slice mode, the processor 102 can also select a slice of data for the slice caches 105a-105b from the backing store memory 106, wherein the slice can comprise one or more programs residing in a memory space of the backing store memory 106, the hard disk 108, other memory/storage components (if necessary), or any combination thereof.

Notably, as described above, the determination of which slice is to be selected can be based on the received instruction, another instruction, or signal. Of course, more than one slice can be selected and the slices can be selected from multiple backing store memories or even lower level cache memories. Typically, the slice will be smaller in size relative to the backing store memory 106, however the various embodiments are not limited in this regard. The slice can be utilized for a variety of operations/tasks including, but not limited to, data compression/decompression, encryption/decryption, video processor functions, or other CPU intensive operations which would benefit from processing at cache memory speeds.

In the various embodiments, the selection of the slice to be copied to the slice caches 105a-105b can be performed in various ways. In a first configuration, the software for the purpose/application/task has some pre-identified sections. There could be tags, flags or any other type of indicia for these sections that allow the processor to automatically recognize them. Optionally, the sections can be prioritized to allow management of the slice caches 105a-105. That is, if the space of the slice caches 105a-105b is limited or otherwise cannot store the various tagged sections, the pre-defined prioritization can permit the processor 102 to determine which sections to include as the slice for slice caches 105a-105b and which sections can be overwritten. Further, in the case where the slice caches 105a-105b include different cache portions with different latencies, the prioritization can be utilized to determine to which cache portion a particular portion of a slice should be copied to.

In a second configuration, prior to or at the time of execution of a task, application, or the like, the processor 102 can be configured to perform an initial analysis of a code without express tags to identify which sections should be copied as the slice to the slice caches 105a-105b. In such a configuration, the processor 102 can be configured to identify certain types of code or code associated with particular types of operations, such as known resource intensive tasks. If such code sections are found, the processor 102 can be configured to select such sections as the slice.

In still another configuration, the selection of a slice can be based on information from a previous execution of the task or application. The information can be used to identify portions that should be included in the slice.

As an alternative to having data for the slice predefined or pre-identified, some embodiments can provide for identifying the portions to be placed into the reserved space on the fly. For example, during execution of a task, application, or the like, the performance of the system can be monitored and data for the slice can be identified based on performance of the system associated with different data, code sections, or the like. For example, a operation associated with a significant latency can be identified can the associated data can be used to define the slice. Alternatively or in combination with this approach, a "superslice" can be identified for the critical operation. Thereafter, the reserved and unreserved portions of the cache memories 104a-104b can be filed with this superslice. During operation, the portions are the most used or most critical from the superslice can then be shifted the reserved space so that a slice with these critical portions is define and persists throughout the slice mode.

In some embodiments, the slice can be selected base on a calculation. For example, in the case where asychronous data of unknown length is being received, a calculation may show that data rates are low enough that normal processing might be adequate to keep up with the inbound flow of data. However, if the calculation indicates otherwise, the slice is reserved. This can also be used to provide an adaptive invocation of the slice mode.

In embodiments where the slice for a task, application, or other operation is identified on the fly, the identification can be memorialized. Accordingly, during future execution of the task and the processor is placed into a slice mode, the on the fly identification is not needed, further reducing latency.

Once the slice is selected from the backing store memory 106, the processor 102 can retrieve from the slice the backing store memory 106 and store the slice in slice cache memory 105a, slice cache memory 105b, or both slice cache memories 105a-b. Notably, the slice can be stored in a sequential order in the slice cache memories 105a-b. The processor 102 can then proceed to process a task utilizing the one or more programs contained in the slice by accessing either or both of the slice cache memories 105a-b. Also, the processing can begin at the virtual zero address of the memory space. When the task has been completed, the processor 102 can terminate the slice mode and enter into a different mode based upon the receipt of an instruction to do so. Notably, the current modes and different modes can comprise a normal mode, a real mode, a virtualization mode, a protected mode, and the slice mode.

Real mode can, for example, be a mode in which applications can have direct access to physical memory, such as backing store memory. Protected mode can be a mode which allows system software to utilize features such as virtual memory and paging to increase control over various applications. Normal mode can be a mode existing under normal operation and processing conditions, a mode returned to after exiting another mode, or a mode that existed prior to entering slice mode. It is important to note that real mode, virtualization mode, normal mode and protected mode can also encompass other definitions understood by one of ordinary skill in the art.

According to a particular embodiment, the processor 102 can be configured to return the slice to the backing store memory 106 upon termination of the slice mode. The processor 102 can also be configured to transfer a cache state and/or contents from slice cache memory 105a, slice cache memory 105b, or both slice cache memories 105a-b to the register 110 of the processor 102 during slice mode. Of course, more than one register can be utilized to retain cache states during a slice process. In another embodiment, the processor 102 can be configured to transfer a current cache state from slice cache memory 105a, slice cache memory 105b or both slice cache memories 105a-b to the backing store memory 106 prior to entering into the slice mode. Upon termination of the slice mode, the processor 102 can be configured to transfer the transferred current cache state from the backing store memory 106 back to the slice cache memories 105a-b. This can allow the cache memories 104a-b to revert to their pre-slice mode state and/or receive back their original cache contents.

In some embodiments, the processor 102 can be configured to operate in a slice mode on an enduring or persistent basis. That is the slice cache memories 105a-b or some other portion of cache memories 104a-104b can provide an enduring portion that is always loaded with a particular slice regardless of other cache operations. This saves the time to load the code in that section and thereby reduces latency in real time scenarios especially. This slice for the enduring portion can be stored in various locations and the processor 102 can include instructions to immediately transfer the slice prior to performing any other operations. Although, such a slice can be stored in the backing store 106 or hard disk 108, in other embodiments, the slice can be stored in non-volatile memory regions that can be accessed at startup, such as ROM, PROM, or Flash memories, and is transferred to slice cache memories 105a-105b of the cache memories 104a-b. For example at start-up, POST, IPL, or Application loading—when it is determined that there will be a need for an enduring portion.

In such embodiments, the processor 102 can be configured, upon startup of system 100, to immediately load a slice stored in a persistent memory location In yet another embodiment, the one or more programs can comprise one or more canned routines stored in the backing store memory 106. The processor 102 can further mark the one or more canned routines as uncacheable. The marked routines can be utilized when slice mode is entered by the processor 102. According to another embodiment, the processor 102 can be configured to load and copy the one or more canned routines to the slice after entering into the slice mode. The one or more canned routines in the slice can be utilized by the processor 102 to rapidly process various tasks. In another embodiment, the one or more slice cache memories 105a-105b can be organized as a real mode space beginning at real address zero.

An example of slice mode in operation using routines can be seen in the context of image construction. Assume an image is to be constructed in a bit-mapped space within a simple display controller. The image can include textures, ray-tracing and other image functions, which typically require a graphics engine or a prohibitive amount of processing at backing store speeds. As the image is being constructed, portions of the overall process can be handed over to routines, which were loaded to the slice created from the cache memory. Once the routines end, the results are mapped to the image. Although a graphics processor could possibly provide more rapid function for the situation above, the slice mode is very useful in providing a solution that does not require a significant amount of expensive hardware to be utilized.

Another example of slice mode in operation can be in the context of sending encrypted messages over a connectivity link to a computer device or system. When receiving such messages, the processor 102 would normally spend a significant amount of processing time in the word processing and the viewing of the composed text. Despite this, performing the encryption and decryption on the receiving end would increase the latency for transmission considerably. This increase in latency can be avoided by utilizing cache capabilities for slice processing at least the encryption portion of the task.

Figure 2:
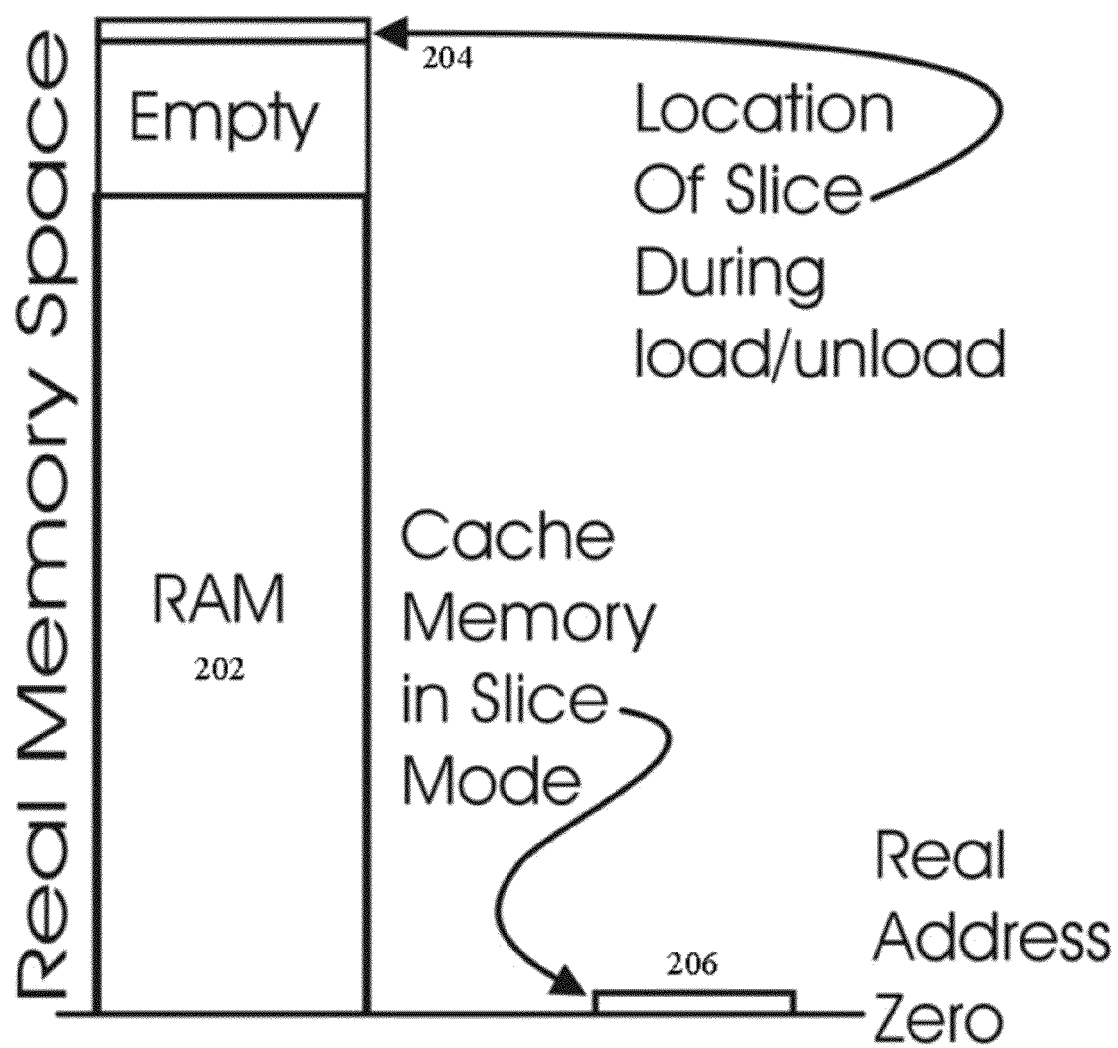
FIG. 2 is a schematic view illustrating slice mode in a system according to the invention.

Referring now also to FIG. 2, a schematic view illustrating slice mode in a system 200 according to the invention is depicted. The system 200 can include a backing store (RAM) 202, which can contain a used portion and an empty portion. Prior to the invocation of slice mode, one or more programs can be contained in a slice in location 204 of the backing store 202. Once slice mode is triggered and entered, the one or more programs contained in the slice can be loaded to cache memory 206, which can be addressed beginning at real address zero. When slice mode is terminated, the one or more programs can be transferred back to the backing store (RAM) 202.

Figure 3:
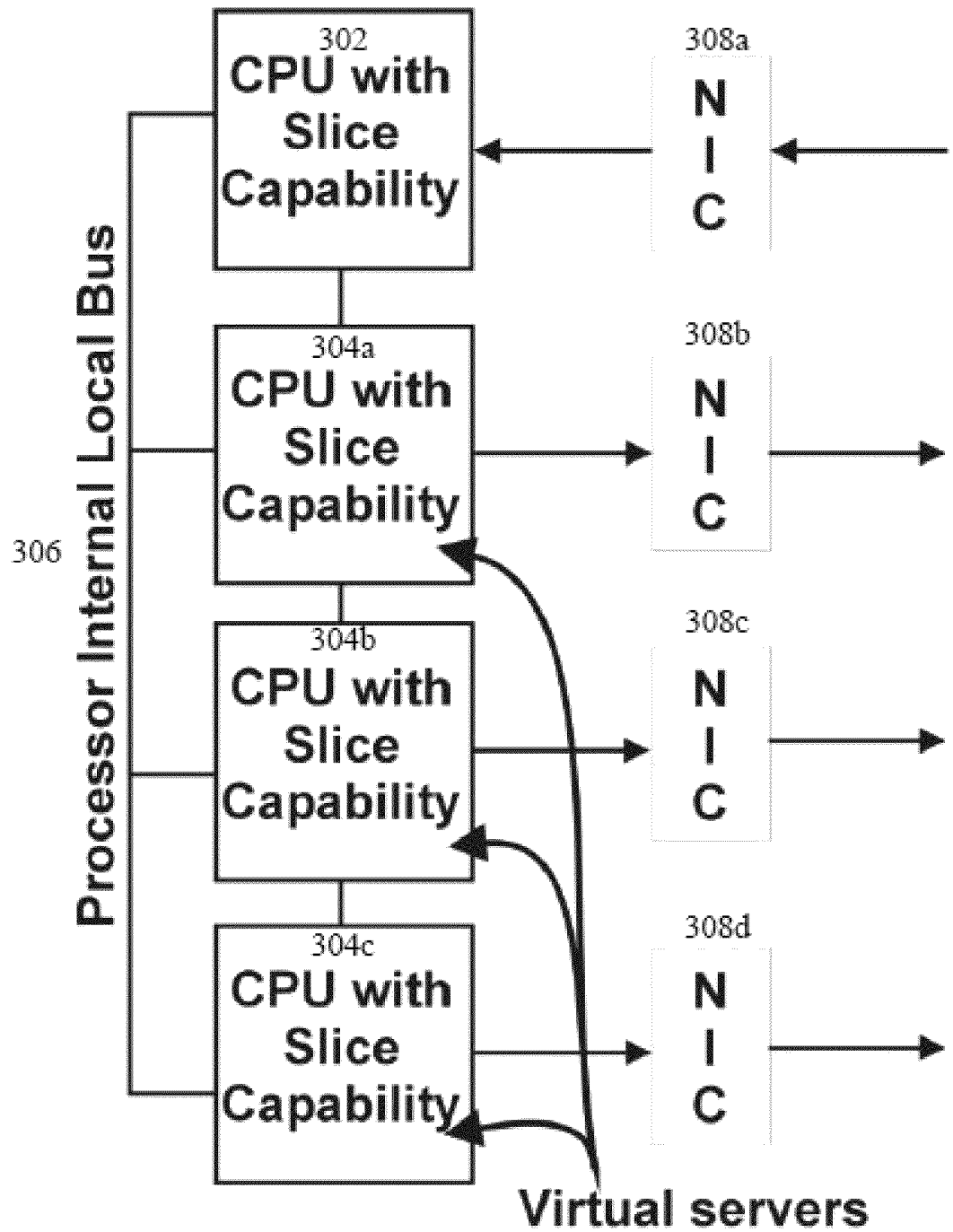
FIG. 3 is an illustration depicting the operation of slice mode in a system featuring a load balancer and virtual servers.

Referring now to FIG. 3 an illustration depicting the operation of slice mode in a system 300 is schematically illustrated. The system 300 can include a load balancer/director 302, which is a CPU with slice capability that can receive various types of requests, including web requests. Additionally, the system can include a set of virtual servers 304a-c, also with slice capability, which are communicatively linked with the load balancer/director 302 using a processor internal local bus 306. The system can also include network interface cards (NIC) 308a-d. The load balancer/director 302 can, for instance, receive a request for a web page via NIC 308a and maintain a list of which virtual servers 304a-c are busy. Next, the load balancer/director 302 can then direct return of the web page to an idle one of the virtual servers 304a-c. The virtual servers 304a-c can then mimic the IP address of the inbound port of the load balancer/director 302. These functions can fit within the slice space so that all the CPUs are operating at full speed.

Figure 4:
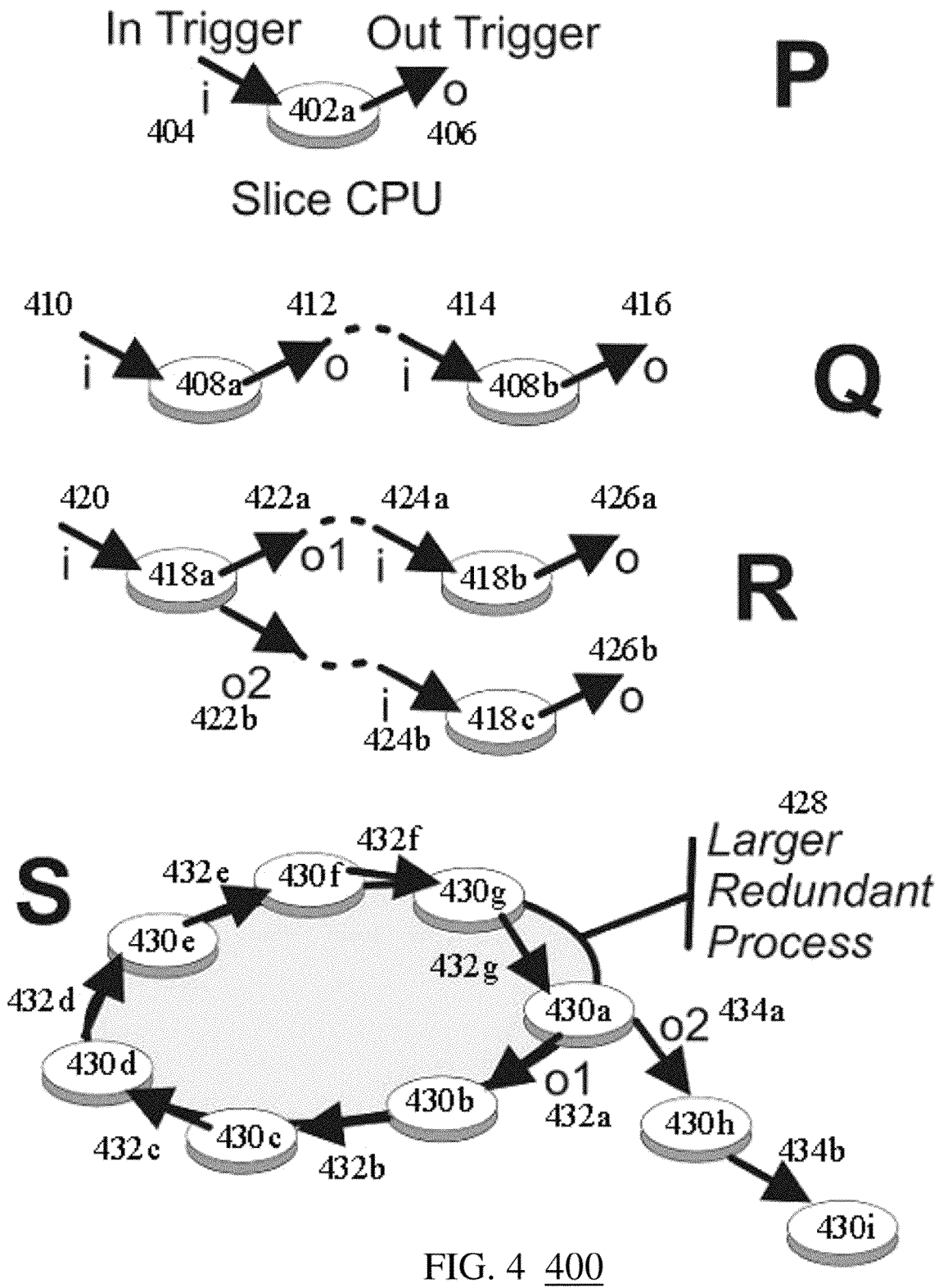
FIG. 4 is schematic view depicting various scenarios for triggering slice mode in a system according to the invention.

Referring now to FIG. 4, a schematic view depicting various scenarios for triggering slice mode in a system 400 is depicted. The scenarios for utilizing and triggering slice mode can include, but are not limited to, the illustrated scenarios (P), (Q), (R), and (S). Scenario (P) features a slice processor 402a with an "in" trigger (i) 404 and an "out" trigger (o) 406. As mentioned above, the "in" trigger 404 can be based on a received instruction, signal or other outside event and can trigger the slice processor 402a into slice mode. The "out" trigger 406, however, can be utilized to trigger other processors into slice mode or other modes. Such a scenario is shown in scenario (Q), which features two slice processors 408a-b. "In" trigger 410 activates slice mode for processor 408a, which then can lead to the transmittal of "out" trigger 412. "Out" trigger 412 can serve as or stimulate the "in" trigger 414 for slice processor 408b. "In" trigger 414 can cause processor 408b to enter into slice mode or another mode. Processor 408b can also send out an "out" trigger 416. Such a use of "in" triggers and "out" triggers can allow for the cascade triggering for as many processors as desired.

Scenario (R) provides for a situation in which there can be multiple conditional "out" triggers. For example, scenario (R) can include three slice processors 418a-c. "In" trigger 420 can activate slice processor 418a into slice mode or another mode. Processor 418a can transmit multiple "out" triggers such as "out" triggers 422a and 422b, which can serve as or stimulate "in" triggers 424a and 424b for processors 418b and 418c respectively. "In" triggers 424a and 424b can cause processors 418b and 418c to enter into slice mode or another mode. It is important to note that processors 418b and 418c do not have to be triggered into the same mode or even triggered into processing the same task. These processors, in turn, can send out their own "out" triggers 426a-b and the process can keep going. Notably, the "out" triggers can be the result of a condition in the processing path in a particular processor.

Scenario (S) provides a situation where multiple processors can be part of a larger redundant process 428. Much like the above scenarios, the slice processors 430a-i can be triggered into slice mode or other modes through the receipt of instructions, signals, and the like. Triggers 432a-g can be used to trigger the processors 430a-g to slice process a particular task or operation and triggers 434a-b can be used to trigger processors 430h-i for a different task or operation. The different tasks and operations being processed by the different sets of processors can all be part of the larger redundant process 428.

An example of where such scenarios can be utilized can be in the context of using multiple processors to reduce a matrix. If, for example, the components of the matrix had to be decoded in sequence, such as in the case of decompressing video, each processor can trigger the next processor in line by connecting the out trigger of the preceding processor to the in trigger of the next processor in line. When the end of a video frame is reached, the first processor can be triggered by the last processor, which can result in the first processor performing the decoding of associated audio. Since the last processor working on video can trigger the first processor into working on audio, this can synchronize audio and video on the start of each frame. This process can keep continuing until a signal or instruction is received to process something else or stop. Such sequential or parallel operations can have conditional links: e.g. an instruction stream might include an instruction that if a picture decodes video and scene is silent, then go to next video, else decode audio.

Furthermore, slice processing can occur as an overlaying process, such as where groups of processors have their own normal modes. The groups of processors can all reside on a single chip or on different chips. One group of processors can be set to print out documents, another set can handing the communication of email to a network, another set can perform an Internet search, and another set can be used for processing and playing a video game. When a signal for slice mode arrives, all of the processors in the above groups can be triggered into performing a particular task and then return to their normal duties upon completion of the task.

Figure 5:
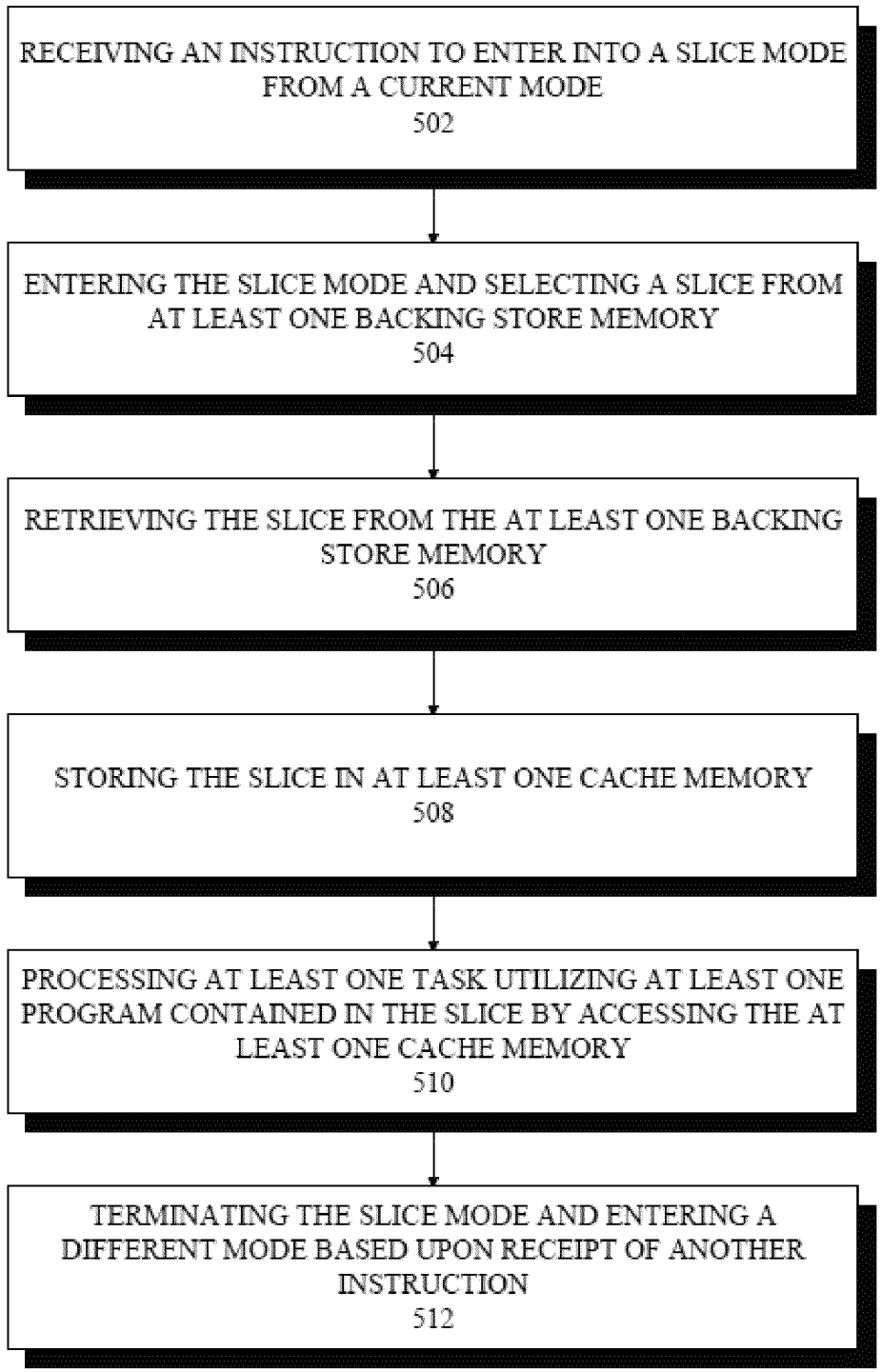
FIG. 5 is a flowchart of steps in a method for task processing in a computing device, according to another embodiment of the invention.

Referring now to FIG. 5, a flowchart is provided that illustrates certain method aspects of the invention. The flowchart depicts steps of a method 500 for task processing in a computing device containing a processor. The method 500 illustratively can include, beginning at step 502, receiving an instruction or signal at the processor to enter into a slice mode from a current mode. The method 500 also can include entering the slice mode and selecting a slice from one or more backing store memories, wherein the slice can comprise one or more programs residing in a memory space of the one or more backing store memories at step 504. The determination of which slice is to be selected can be dictated by the received instruction or signal or other instructions. Also, it is important to note that the slice can contain portions of programs, computer instructions, and the like. The backing store memories can comprise one or more of a random-access memory, a hard disk, a magnetic disk, an optical disk, a cache memory, a flash memory, and other memories.

Additionally, the method 500 can include at step 506 retrieving the slice from the one or more backing store memories. The method 500 also can include storing the slice in one or more cache memories at step 508. Notably, the slice can be stored in the cache memories in a sequential order. The method 500 further can include at step 510 processing one or more tasks utilizing the one or more programs contained in the slice by accessing the one or more cache memories. Moreover, the method 500 can include terminating the slice mode and entering a different mode based upon receipt of another instruction at the concluding step 512. The current mode and the different mode can comprise include, for example, a normal mode, a real mode, a virtualization mode, and a protected mode.

In a particular embodiment, the method 500 can further comprise returning the slice to the one or more backing store memories upon termination of the slice mode. The method 500 can also include transferring a cache state and/or contents from the one or more cache memories to one or more registers of the computing device during slice mode. According to another embodiment, the method 500 can further include transferring a current cache state and/or cache contents from the one or more cache memories to the one or more backing store memories prior to entering into the slice mode. When slice mode is terminated, the method 500 can further include transferring the transferred current cache state and/or cache contents from the one or more backing store memories back to the one or more cache memories.

According to yet another embodiment, the one or more programs can comprise one or more canned routines stored in the backing store memory and further comprise marking the one or more canned routines as uncacheable. The method 500 can also include loading and copying the one or more canned routines to the one or more cache memories after entering into the slice mode. These canned routines can be utilized by the processor to aid in the processing of various tasks and operations. In another embodiment, the method 500 can further include organizing the cache memory as a real mode space beginning at real address zero.

According to still another embodiment, the methods described above can be used advantageously to improve performance in processors with multiple cores. In such processors, each core is typically associated with a separate cache memory or the cores will share a cache memory, where particular portions of the cache memory are associated with particular ones of the cores. In embodiments where a one of the cores is placed in a slice mode and it is determined that a slice of a particular size is needed or a particular size of the slice cache is needed, the multi-core processor can examine the use among the various cores to identify unused or underutilized portions of the cache memories associated with the various cores. Thereafter, the identified portions of the separate cache memories can be pooled together to provide the size need for the particular slice mode. At the end of the slice mode, these portions can be released back to their respective cores for normal processing.

The invention can be realized in hardware, software, or a combination of hardware and software. The invention can be realized in a centralized fashion in one computer system or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, (defining a computer program) which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

I claim:

1. A computer-based method for task processing in a computing device, the method comprising the steps of:
   entering a slice mode for at least one task, the entering comprising reserving one or more portions of a cache memory to yield a slice cache memory for the task;
   storing a slice in the slice cache memory, wherein the slice comprises at least one program residing in at least one memory space outside of the slice cache memory and associated with the at least one task;
   processing the at least one task utilizing the at least one program by accessing the at least one slice cache memory until the slice mode is terminated.

2. The method of claim 1, further comprising entering a different mode upon termination of the slice mode, wherein the different mode comprises at least one among a normal mode, a real mode, a virtualization mode, and a protected mode.

3. The method of claim 1, wherein the at least one memory space outside of the slice cache memory comprises a backing store memory, the backing store memory comprising a non-cache memory of the computing device.

4. The method of claim 1, further comprising returning the slice to the at least one memory space upon termination of the slice mode.

5. The method of claim 1, further comprising transferring a cache state from the at least one slice cache memory to at least one register of the computing device during slice mode.

6. The method of claim 1, further comprising transferring at least one of a current cache state and cache contents from the at least one slice cache memory to the at least one memory space prior to entering into the slice mode.

7. The method of claim 1, wherein the at least one program comprises at least one canned routine stored in the at least one memory space and further comprising marking the at least one canned routine as uncacheable.

8. The method of claim 1, wherein the at least one slice cache memory is organized as a real mode space beginning at real address zero.

9. A computer-based system for optimizing task processing by utilizing cache capabilities, the system comprising:
   at least one processor configured to process and manage data;
   at least one cache memory communicatively linked to the at least one processor; and,
   at least one backing store memory communicatively linked to the at least one processor and to the at least one cache memory,
   wherein the at least one processor is configured to:
      enter a slice mode for at least one task, the entering comprising reserving one or more portions of a cache memory to yield a slice cache memory for the task;
      storing a slice in the slice cache memory, wherein the slice comprises at least one program residing in at least one memory space outside of the slice cache memory and associated with the at least one task;
      processing the at least one task utilizing the at least one program by accessing the at least one slice cache memory until the slice mode is terminated.

10. The system of claim 9, wherein the processor is further configured to enter a different mode upon termination of the slice mode, wherein the different mode comprises at least one among a normal mode, a real mode, a virtualization mode, and a protected mode.

11. The system of claim 9, wherein the at least one memory space outside of the slice cache memory comprises a backing store memory, the backing store memory comprising a non-cache memory of the computing device.

12. The system of claim 9, wherein the at least one processor is configured to return the slice to the at least one memory space upon termination of the slice mode.

13. The system of claim 9, wherein the at least one processor is configured to transfer a cache state from the at least one slice cache memory to at least one register of the at least one processor during slice mode.

14. The system of claim 9, wherein the at least one processor is configured to transfer at least one of a current cache state and cache contents from the at least one slice cache memory to the at least one memory space prior to entering into the slice mode.

15. The system of claim 9, wherein the at least one program comprises at least one canned routine stored in the at least one memory space and wherein the at least one processor marks the at least one canned routine as uncacheable.

16. The system of claim 9, wherein the at least one cache memory is organized as a real mode space beginning at real address zero.

17. The system of claim 9, wherein the at least one processor is a plurality of processors, and wherein a processor of the plurality of processors can be in a different mode from another processor of the plurality of processors.

18. The system of claim 9, wherein a processor of the at least one processor can trigger another processor of the at least one processor into at least one of slice mode, real mode, virtualization mode, normal mode, and protected mode.

19. A non-transitory computer-readable storage medium having stored therein computer-readable instructions, which, when loaded in and executed by a computer, causes the computer to perform the steps of:
   entering a slice mode from a current mode and selecting a slice from a backing store memory, wherein the slice comprises at least a portion of a program residing in a memory space of the backing store memory;
   retrieving and copying the slice from the backing store memory to a cache memory, wherein the slice is copied to the cache memory in a sequential order;
   processing at least one task utilizing the portion of the program contained in the slice by accessing the cache memory; and
   terminating the slice mode and entering a different mode based upon receipt of an instruction.

20. The non-transitory computer-readable storage medium of claim 19, wherein the current mode and the different mode comprise at least one among a normal mode, a real mode, a virtualization mode, and a protected mode.

21. The non-transitory computer-readable storage medium of claim 19, wherein the backing store memory comprises at least one of a random-access memory, a hard disk, a magnetic disk, an optical disk, a cache memory, a flash memory, and other memories.

22. The non-transitory computer-readable storage medium of claim 19, further comprising code for causing the computer to return the slice to the backing store memory upon termination of the slice mode.

23. The non-transitory computer-readable storage medium of claim 19, further comprising code for causing the computer to transfer a cache state from the cache memory to at least one register during slice mode.

24. The non-transitory computer-readable storage medium of claim 19, further comprising code for causing the computer to transfer at least one of a current cache state and cache contents from the cache memory to the backing store memory prior to entering into the slice mode.

25. The non-transitory computer-readable storage medium of claim 19, wherein the program comprises at least one canned routine stored in the backing store memory and further comprising code for marking the at least one canned routine as uncacheable.

26. The non-transitory computer-readable storage medium of claim 19, wherein the cache memory is organized as a real mode space beginning at real address zero.

* * * * *